United States Patent
Landphair

(10) Patent No.: US 8,522,700 B2
(45) Date of Patent: Sep. 3, 2013

(54) AIR SEEDER WITH GPS BASED ON/OFF CONTROL OF INDIVIDUAL ROW UNITS

(76) Inventor: Donald K. Landphair, Bettendorf, IA (US)

( * ) Notice: Subject to any disclaimer, the term of this patent is extended or adjusted under 35 U.S.C. 154(b) by 1151 days.

(21) Appl. No.: 12/173,368

(22) Filed: Jul. 15, 2008

(65) Prior Publication Data

US 2010/0017073 A1 Jan. 21, 2010

(51) Int. Cl.
*A01C 7/08* (2006.01)
(52) U.S. Cl.
USPC ............ 111/175; 701/468; 111/170; 111/174
(58) Field of Classification Search
USPC .................................. 111/174, 175, 170, 200
See application file for complete search history.

(56) References Cited

U.S. PATENT DOCUMENTS

| | | | |
|---|---|---|---|
| 2,895,768 A * | 7/1959 | Bray, Jr. ...................... 406/109 |
| 3,515,315 A * | 6/1970 | Kidd ............................. 406/182 |
| 4,082,364 A * | 4/1978 | Krambrock .................... 406/33 |
| 4,113,148 A | 9/1978 | Ernst |
| 5,074,228 A * | 12/1991 | Daws ........................... 111/175 |
| 5,265,547 A * | 11/1993 | Daws ........................... 111/175 |
| 5,324,143 A | 6/1994 | Sanders |
| 5,646,846 A | 7/1997 | Bruce et al. |
| 5,757,640 A | 5/1998 | Monson |
| 5,915,313 A | 6/1999 | Bender et al. |
| 5,947,040 A | 9/1999 | Gregor |
| 5,980,163 A | 11/1999 | Gregor et al. |
| 6,009,354 A | 12/1999 | Flamme et al. |
| 6,024,035 A | 2/2000 | Flamme |
| 6,070,539 A | 6/2000 | Flamme et al. |
| 6,283,679 B1 | 9/2001 | Gregor et al. |
| 6,553,299 B1 | 4/2003 | Keller et al. |
| 6,782,835 B2 * | 8/2004 | Lee et al. ...................... 111/174 |
| 6,851,377 B2 | 2/2005 | Mayerle et al. |
| 6,883,445 B2 * | 4/2005 | Mayerle ........................ 111/175 |
| 6,928,939 B1 * | 8/2005 | Johnson et al. ............... 111/175 |
| 7,111,567 B2 | 9/2006 | Carr et al. |
| 7,213,617 B2 | 5/2007 | Snipes et al. |
| 7,347,149 B2 * | 3/2008 | Mayerle et al. ............... 111/175 |
| 7,395,769 B2 | 7/2008 | Jensen |
| 7,555,990 B2 * | 7/2009 | Beaujot ........................ 111/123 |
| 8,001,914 B2 * | 8/2011 | Peterson et al. .............. 111/175 |

FOREIGN PATENT DOCUMENTS

| | | |
|---|---|---|
| DE | 4308125 A1 | 9/1994 |
| DE | 20202328 U1 | 7/2002 |
| DE | 202004004381 U1 | 8/2004 |
| DE | 10319047 A1 | 11/2004 |
| SU | 668639 | 6/1979 |
| SU | 1754200 | 8/1992 |

\* cited by examiner

*Primary Examiner* — Kaitlin Joerger
*Assistant Examiner* — Ernesto Suarez

(57) ABSTRACT

An air seeder includes a product tank having an interior, an air lock in communication with the product tank interior, a plurality of product boots, a pneumatic distribution system, and a plurality of diverter assemblies. The pneumatic distribution system includes an air source and a plurality of distribution lines. The air source is in communication with the product tank interior. Each distribution line is fluidly coupled with at least one corresponding product boot. Each diverter assembly includes an inlet coupled with the air source, a first outlet coupled with at least one distribution line, a second outlet in communication with the air lock, and a diverter for selectively diverting air and entrained product from the inlet to the first outlet or the second outlet.

10 Claims, 3 Drawing Sheets

AIR SEEDER WITH GPS BASED ON/OFF CONTROL OF INDIVIDUAL ROW UNITS

FIELD OF THE INVENTION

The present invention relates to air seeders, and, more particularly, to product distribution systems for such air seeders.

BACKGROUND OF THE INVENTION

Air seeders and other seeding devices are commonly towed by tractors to apply seed or fertilizer, or both simultaneously, to a field. As an example, an air seeder may be towed in combination with a tilling implement, one behind the other, to place seed and fertilizer under the surface of the soil. An air seeder has as its central component a wheeled seed cart which comprises one or more frame-mounted product tanks for holding product, generally seed or fertilizer or both. Air seeders also generally include a metering system for dispensing product from the tanks and a pneumatic distribution system for delivering the product from tank to soil.

An air seeder may include product tanks which are pressurized with air from the pneumatic distribution system. The pneumatic distribution system of an air seeder generally utilizes a centrifugal fan to provide at least one airstream which flows through the pneumatic distribution system to seed boots where product is deposited in the soil. Product is first introduced to the air stream by the metering system at a venturi in the primary distribution manifold located below the metering system. Product is carried by the air stream through distribution lines to a series of secondary distribution manifolds ("headers"), which in turn distribute product through distribution lines to seed boots mounted behind ground openers on the tilling implement so that the product may be evenly delivered to the span of ground acted upon by the tilling implement.

In positive pressure seeding systems, some air is diverted from the pneumatic distribution system to the product tanks to pressurize the tanks. Ideally, the product tanks are maintained at the same pressure as the airstream which carries product from the product tank. If air pressure in the product tanks is too low the product will not enter the airstream correctly and pulsing will occur. If air pressure is too high, "blow-by" of unmetered product by the bottom or top of the meter will occur. Either of these situations is undesirable.

With air seeders as described above, it is not currently possible to automatically control seed population on a row by row basis, particularly in the event that it is desirable to seed with certain rows while not seeding with other rows. With other types of row crop planters using individually driven seed meters at the row unit, such as corn or soybean planters on a 30 inch row spacing, it is known to independently drive the seed meters such that each row can plant at different seed populations, or not seed at all. However, with an air seeder, the metering is typically done in more of a bulk manner at the primary distribution manifold, and the seeds are then further directed toward the different row units at the secondary headers. Examples of primary and secondary distribution manifolds which may be used with air seeders are disclosed in U.S. Pat. No. 5,947,040 (Gregor) and U.S. Pat. No. 5,980,163 (Gregor et al.), each of which are assigned to the assignee of the present invention and incorporated herein by reference.

What is needed in the art is an air seeder which allows product application independently on a row by row basis, subject to current operating parameters.

SUMMARY OF THE INVENTION

The invention in one form is directed to an air seeder including a product tank having an interior, an air lock in communication with the product tank interior, a plurality of product boots, a pneumatic distribution system, and a plurality of diverter assemblies. The pneumatic distribution system includes an air source and a plurality of distribution lines. The air source is in communication with the product tank interior. Each distribution line is fluidly coupled with at least one corresponding product boot. Each diverter assembly includes an inlet coupled with the air source, a first outlet coupled with at least one distribution line, a second outlet in communication with the air lock, and a diverter for selectively diverting air and entrained product from the inlet to the first outlet or the second outlet.

The invention in another form is directed to an air seeder including a product tank having an interior, an air lock mounted to a top of the product tank, a product boot, a pneumatic distribution system including an air source, and a diverter assembly. The air lock has an inlet, and an outlet in communication with the product tank interior. The diverter assembly includes an inlet coupled with the air source, a first outlet in communication with the product boot, a second outlet in communication with the air lock inlet, and a diverter for selectively diverting air and entrained product from the inlet to the first outlet or the second outlet.

The invention in yet another form is directed to an air seeder, including a product tank having an interior, a plurality of row units, a pneumatic distribution system, a plurality of diverter assemblies, a GPS, and an electrical processing circuit. The pneumatic distribution system includes an air source and a plurality of distribution lines. The air source is in communication with the product tank interior. Each distribution line is fluidly coupled with at least one corresponding row unit. Each diverter assembly includes an inlet coupled with the air source, a first outlet coupled with at least one distribution line, a second outlet in communication with the product tank interior, and a diverter. The GPS provides output signals corresponding to a position of at least one row unit. An electrical processing circuit receives output signals from the GPS, and selectively controls operation of the plurality of diverters, dependent upon the GPS output signals, for selectively diverting air and entrained product from the inlet to the first outlet or the second outlet.

DETAILED DESCRIPTION OF THE INVENTION

Figure 1:
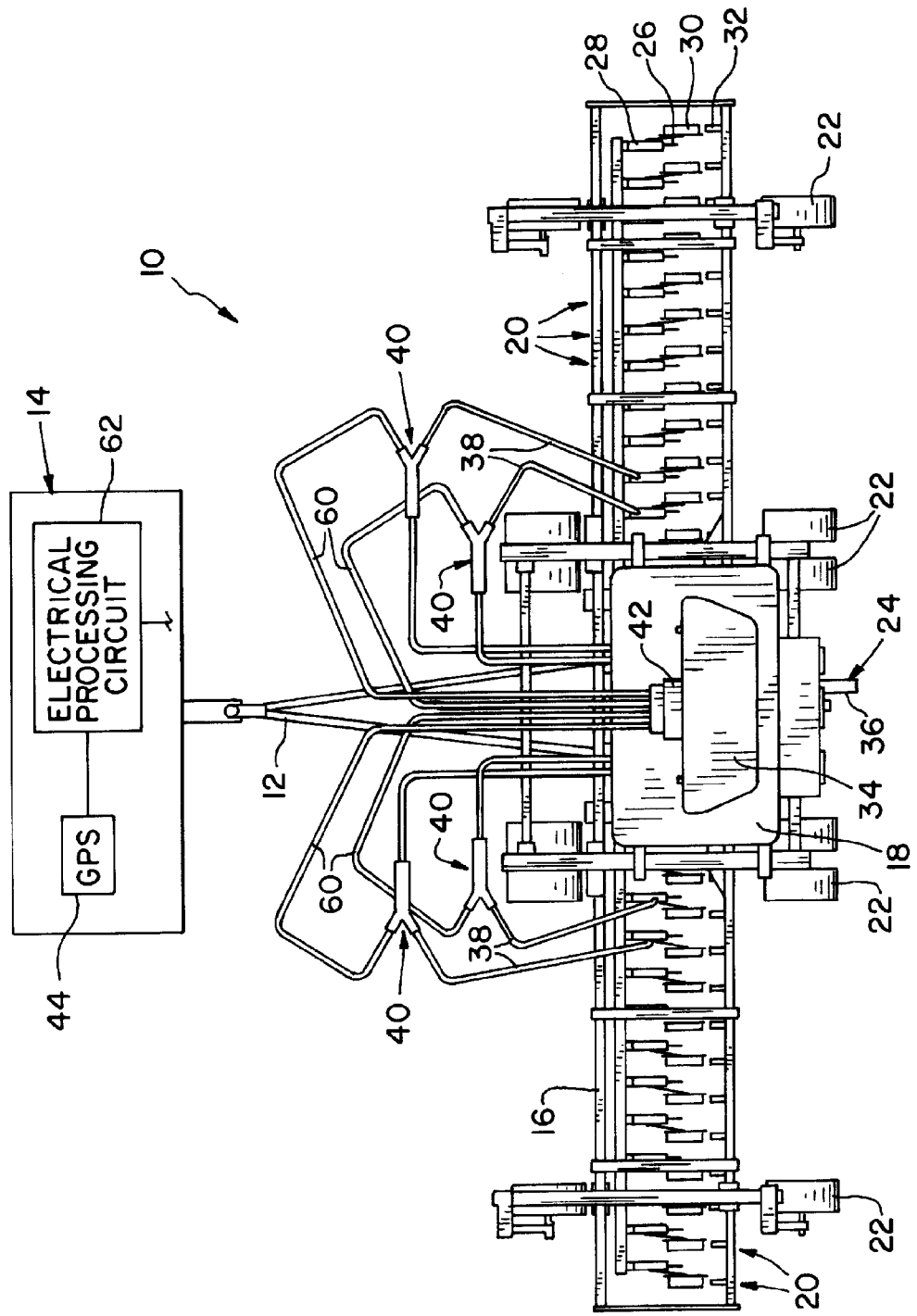
FIG. 1 is a partially schematic, top view of an embodiment of an air seeder of the present invention.
Figure 2:
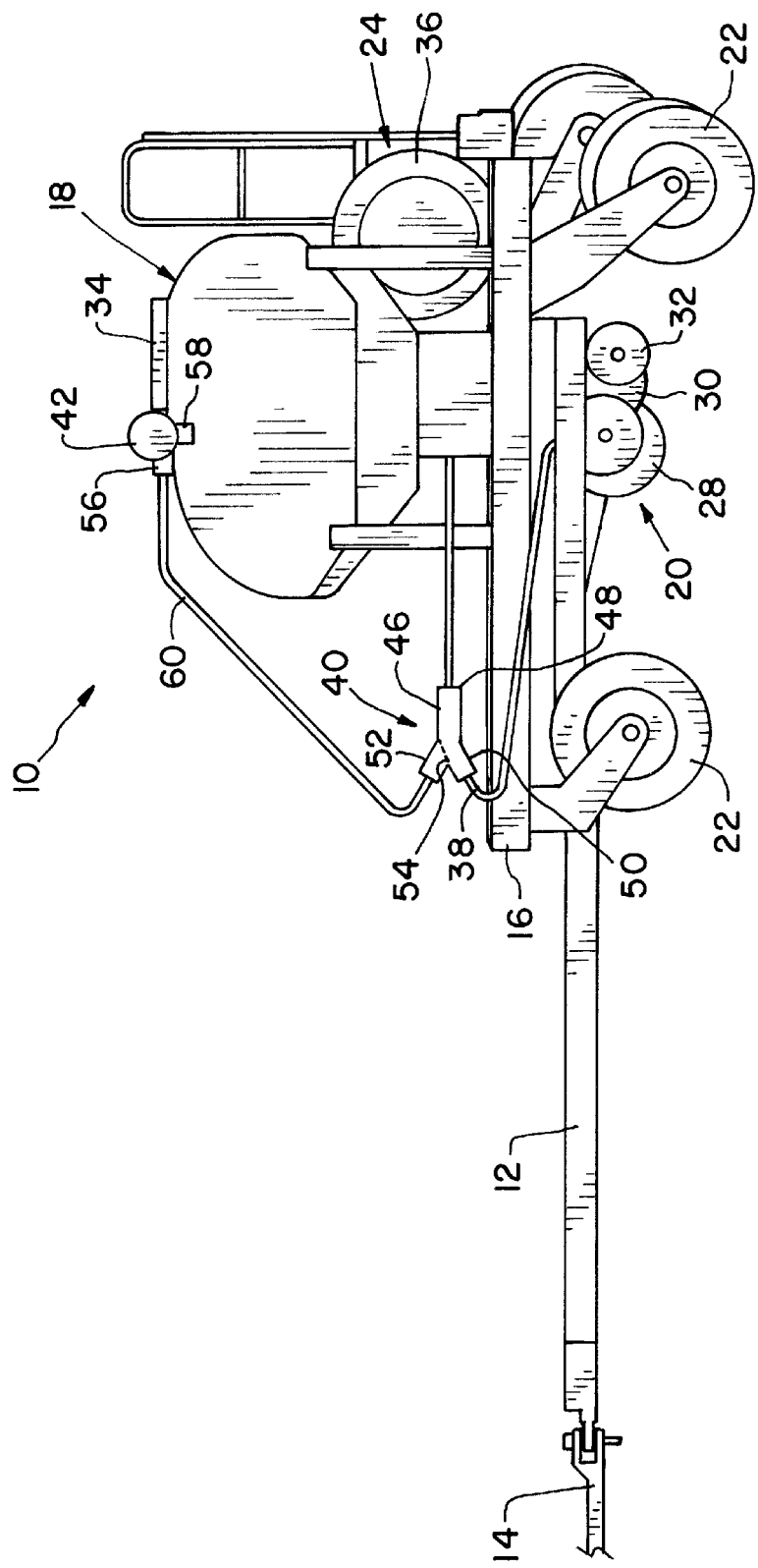
FIG. 2 is a partially schematic, side view of the air seeder shown in FIG. 1.

Referring now to the drawings, and more particularly to FIGS. 1 and 2, there is shown an embodiment of an air seeder 10 of the present invention. Air seeder 10 generally includes a drawbar 12 attached to a base unit 14 (shown schematically in FIG. 1), such as an agricultural tractor. Drawbar 12 is attached to a frame 16 which forms the basic support structure for the remaining components of air seeder 10, such as a product tank 18, row units 20, wheels 22, and pneumatic distribution system 24.

Each row unit 20 generally includes a product boot 26 which is positioned behind an opener, such as a disk opener 28. Product boot 26 is positioned in front of a closing wheel 30 and a press wheel 32, in known manner. The exact configuration of the opening, closing and/or pressing arrangement is not critical to the present invention and can vary.

Product tank 18 has an interior (not specifically shown) under fill lid 34. The interior can be configured as a single compartment or divided into multiple compartments. Product tank 18 is assumed to carry seed, but could carry a different type of agricultural commodity, such as fertilizer. If configured as a multi-compartment tank, it is also possible to put one type of product (such as seed) in one compartment, and put another type of product (such as fertilizer) in the other compartment. Product tank 18 is also assumed to be a pressurized tank, but could be configured as a non-pressurized tank.

Wheels 22 support air seeder 10, and may also be used as a ground drive for various on-board functions, such as seed metering, operation of the blower for the pneumatic distribution system 24, etc. The pneumatic distribution system 24 includes an air source in the form of a centrifugal blower 36 generally providing a high volume, low velocity air flow for transporting air and entrained product through a plurality of distribution lines 38 to the product boots 26 at each row unit 20. The plurality of distribution lines 38 typically interconnect a secondary distribution manifold (or header, not shown) to the product boots 26 at each row unit 20. In the case of a single rank air seeder as shown in FIGS. 1 and 2 (having a single "rank" or row of opener/closer assemblies), each distribution line 38 typically leads to a single corresponding product boot 26. On the other hand, in the case of a double rank air seeder (having two ranks or rows of opener/closer assemblies), each distribution line 38 may lead to a splitter which splits the air and entrained product between two product boots 26. For an example of a splitter which may be used with a double rank air seeder, reference is made to U.S. Pat. No. 7,213,617 (Snipes et al.), which is assigned to the assignee of the present invention and incorporated herein by reference.

According to an aspect of the present invention, air seeder 10 also includes a plurality of diverter assemblies 40, an air lock 42, and a GPS 44. Each diverter assembly 40 is coupled with a distribution line 38 leading from the secondary header to a corresponding one (single rank) or two (double rank) product boots 26. Each diverter assembly 40 includes a generally Y-shaped housing 46 having an inlet 48 coupled with blower 36, a first outlet 50 coupled with at least one distribution line 38, a second outlet 52 in communication with air lock 42, and a diverter 54 for selectively diverting air and entrained product from inlet 48 to the first outlet 50 or second outlet 52 (FIG. 2). In the embodiment shown, diverter 54 is in the form of a diverter plate which is selectively positionable to cover first outlet 50 or second outlet 52, and thereby direct air and entrained product to first outlet 50 or second outlet 52. However, diverter 54 could be a different type of diverter, such as an automatically controllable gate valve or the like.

When product tank 18 is configured as a pressurized tank, as shown, an air lock 42 is mounted to the top of product tank 18, and generally isolates the respective operating pressures within distribution lines 38 and the interior of product tank 18. Air lock 42 includes an inlet 56 in communication with one or more second outlets 52 or respective diverter assemblies 40, and an outlet 58 which is in communication with the interior of product tank 18. In the embodiment shown, air lock 42 is configured as a rotary air lock, which could be configured similar to that shown in U.S. Pat. No. 5,324,143 (Sanders). In the '143 patent, the rotary lock is used at the bottom of a bulk tank used to supply seed to an automatic air filling system used to fill the hoppers on a row crop planter. In contrast, the present invention uses a rotary air lock at the top of an onboard product tank 18 so that the seed falls into the product tank in the event a particular row unit 20 is automatically turned OFF during a seeding operation. The rotary air lock is therefore positioned at the top of the destination container (product tank 18), and at the end of the return line 60.

If product tank 18 is not pressurized, an air lock is likely not required and return lines 60 can simply terminate at the top of product tank 18. The returned product can be discharged from return lines 60 into the interior of product tank 18.

According to another aspect of the present invention, each diverter assembly 40 is automatically controlled by an electrical processing circuit 62, dependent upon signals received from GPS 44 (FIG. 1). Electrical processing circuit 62 and GPS 44 are each shown as being mounted on base unit 14, but could be mounted on air seeder 10, or split between the two. It is also possible to have more than one electrical processing circuit or GPS, and the particular configuration of each, such as the hardware, software, firmware, etc. can vary.

GPS 44 provides output signals to electrical processing circuit 62 representing the position of base unit 14 and/or air seeder 10. Based upon the position of the GPS 44 on the base unit 14 or air seeder 10, as well as the specific geometry of the base unit and air seeder (e.g., width and length of base unit, length of hitch and drawbar, row spacing, number of row units, etc.), it is possible to calculate, look up or infer the position of each row unit 20 as air seeder 10 moves through a field. The output signals from GPS 44 are thus used by electrical processing circuit 62 for selectively controlling operation of diverter assemblies 40.

Figure 3:
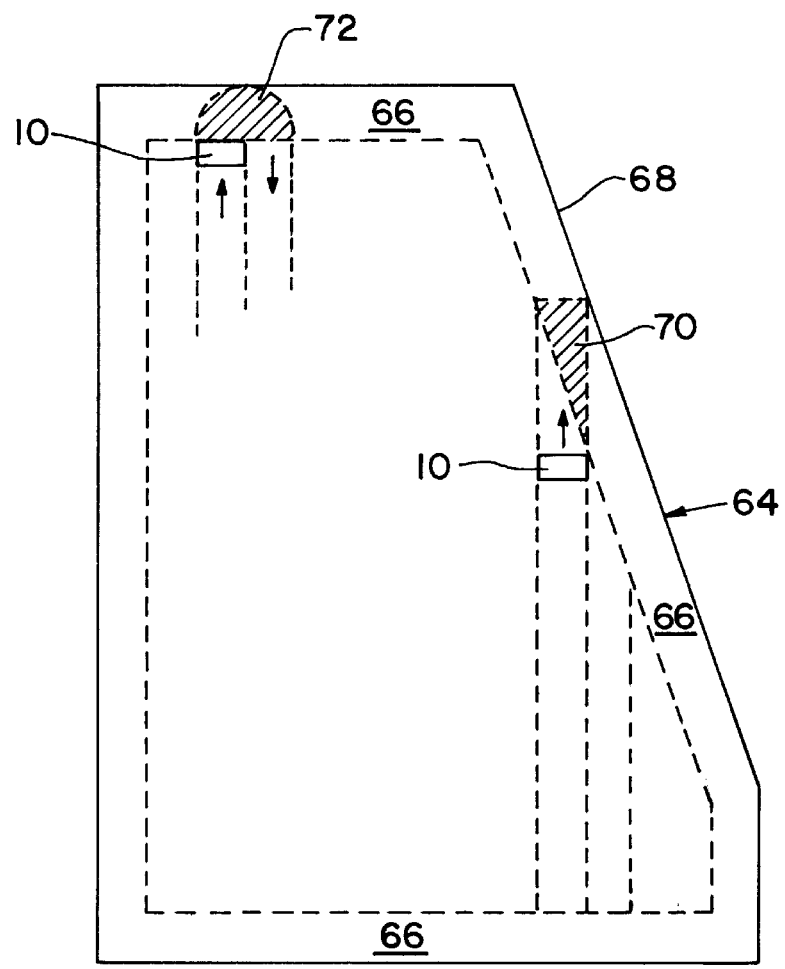
FIG. 3 is a simplified, schematic representation of an agricultural field in which the air seeder of FIGS. 1 and 2 could be used.

For example, referring to FIG. 3, a field 64 may not have a square or rectangular shape. Generally, an operator travels around the perimeter of the field for 2-4 rounds, depending on the size of the equipment. This creates "end rows" 66 which allow the seeder to be turned around without missing soil, and also allow the field to be opened in the fall using a combine. After the end rows are seeded, the air seeder then typically is moved in successive passes back and forth across the field, picking up the seeder at the end of the field in the end row area, turning around, dropping the seeder, and heading back in an opposite direction.

On the right side of the field 64, the field edge 68 angles inward. If all of the row units continue to seed as the air seeder 10 is moved into the end row area (designated with cross hatching at area 70), then double seeding occurs which over uses the seed and fertilizer and may result in a reduction in yield due to over-population. On the other hand, if the air seeder is stopped too soon before the end row area, then a gap in seeding occurs, which is also undesirable. This same situation can occur at the ends of the field if the air seeder 10 is turned around in the end row areas without raising from the ground (as designated in the cross hatched area 72). With the present invention, the position of each row unit can be calculated, looked up or inferred, and electrical processing circuit 62 selectively operates each row unit 20 through selective control of diverters 54. For example, as air seeder 10 moves into cross hatched area 70, row units 20 can be turned OFF sequentially or in groups by diverting air and entrained product back to product tank 18 through selective control of diverters 54. This results in a better use of seed and fertilizer, and optimized yields.

Having described the preferred embodiment, it will become apparent that various modifications can be made without departing from the scope of the invention as defined in the accompanying claims.

The invention claimed is:

1. An air seeder, comprising:
a product tank having an interior;
a plurality of product boots;
a pneumatic distribution system including an air source and a plurality of distribution lines, said air source being in communication with said product tank interior, each said distribution line being fluidly coupled with at least one corresponding said product boot;
an air lock in communication with said product tank interior and each said plurality of distribution lines, said airlock isolating the operating pressures of each of said plurality of said distribution lines from said product tank; and,
a plurality of diverter assemblies, each said diverter assembly including an inlet coupled with said air source, a first outlet coupled with at least one said distribution line, a second outlet from each of said diverter assemblies in communication with said air lock, and a diverter for selectively diverting air and entrained product from said inlet to one of said first outlet and said second outlet.

2. The air seeder of claim 1, wherein each said diverter assembly includes a generally Y-shaped housing, and said diverter is a diverter plate which is selectively positionable to direct air and entrained product to one of said first outlet and said second outlet.

3. The air seeder of claim 1, wherein said entrained product includes one of seed and fertilizer.

4. The air seeder of claim 1, wherein said air lock is a rotary air lock.

5. The air seeder of claim 1, wherein said air lock is mounted to a top of said product tank.

6. The air seeder of claim 1, wherein each said distribution line is fluidly coupled with a single said product boot.

7. The air seeder of claim 1, including an electrical processing circuit and a global positioning system (GPS) providing output signals to said electrical processing circuit, said electrical processing circuit coupled with and controlling said selective operation of said plurality of diverters.

8. The air seeder of claim 7, wherein said electrical processing circuit independently controls said selective operation of said plurality of diverters, whereby air and entrained product can be transported to said product boots from some of said diverter assemblies, and whereby air and entrained product can be returned to said product tank from other of said diverter assemblies.

9. An air seeder, comprising:
a product tank having an interior;
a plurality of row units;
a pneumatic distribution system including an air source and a plurality of distribution lines, said air source being in communication with said product tank interior, each said distribution line being fluidly coupled with at least one corresponding said row unit;
an air lock mounted to a top of said product tank, said air lock having an inlet in communication with said pneumatic distribution system, and an outlet in communication with said product tank interior, said airlock isolating the operating pressures of each of said plurality of said distribution lines from said product tank;
a plurality of diverter assemblies, each said diverter assembly including an inlet coupled with said air source, a first outlet coupled with at least one said distribution line, a second outlet from each of said diverter assemblies in communication with said air locks, and a diverter;
a global positioning system (GPS) providing output signals corresponding to a position of at least one said row unit; and
an electrical processing circuit receiving said output signals from said GPS, and selectively controlling operation of said plurality of diverters, dependent upon said GPS output signals, for selectively diverting air and entrained product from said inlet to one of said first outlet and said second outlet.

10. The air seeder of claim 9, wherein said electrical processing circuit independently controls said selective operation of said plurality of diverters, whereby air and entrained product can be transported to said row units from some of said diverter assemblies, and whereby air and entrained product can be returned to said product tank from other of said row units.

\* \* \* \* \*